Oct. 17, 1950     R. J. GARTNER     2,526,216
BINDING BAND TENSIONING DEVICE
Filed Jan. 12, 1949     2 Sheets-Sheet 1
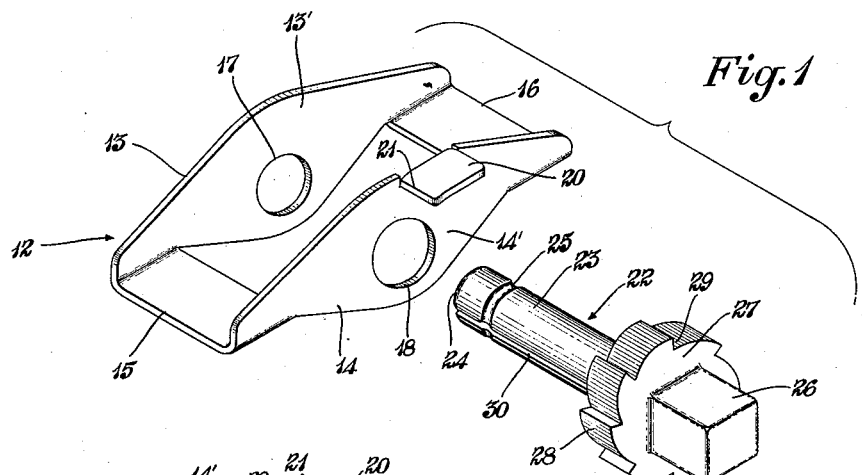
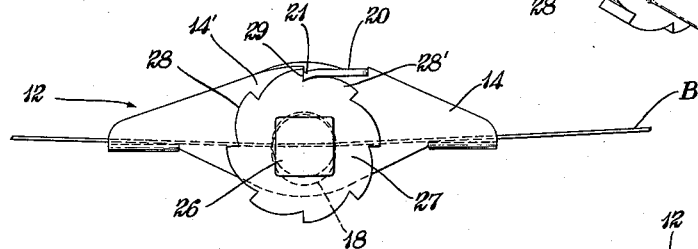
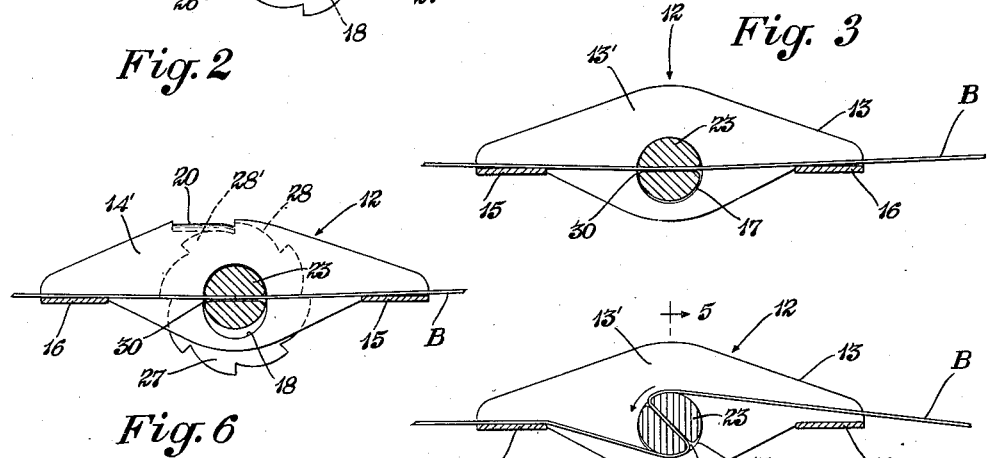
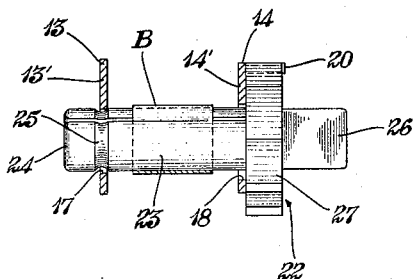
INVENTOR.
Raymond J. Gartner
BY
*Freese and Bishop*
ATTORNEYS Oct. 17, 1950     R. J. GARTNER     2,526,216
BINDING BAND TENSIONING DEVICE Filed Jan. 12, 1949     2 Sheets-Sheet 2

INVENTOR.
Raymond J. Gartner
BY
Frease and Bishop
ATTORNEYS

Patented Oct. 17, 1950

2,526,216

UNITED STATES PATENT OFFICE 2,526,216

BINDING BAND TENSIONING DEVICE

Raymond J. Gartner, Canton, Ohio

Application January 12, 1949, Serial No. 70,569

10 Claims. (Cl. 24—71.2)

The invention relates generally to flexible preferably metallic straps or bands which are drawn around a bundle of articles to bind them tightly together, and more particularly to a device for tensioning or tightening such a strap during or after application.

Metal bands are widely used for binding bundles of bars, rods, pipes, or other articles together, and also to strap such bundles or loads to truck or railway car platforms, to ship or airplane decks, and to shipping pallets, for transporting the loads over long or short distances.

The conventional manner of applying such bands to the loads is by using a special clamping tool adapted for drawing the overlapping ends of the band together under tension, then sliding a soft metal sleeve over the overlapping ends while holding them under tension, and then crimping the edges of the sleeve and overlapped ends with a special crimping tool to secure the ends together under tension, after which the loose end of the band may be cut off with suitable shears.

This method requires one to have on hand three tools, the special clamping and holding tool, the special crimping tool, and the shears, when binding a bundle for shipment. These clamping and crimping tools are expensive, and heavy and unwieldy to handle.

When such bundles are being transported, the jarring and shifting of the load will frequently cause the pieces of a bundle to settle and the band to become slack. Such condition becomes the more dangerous as the loose pieces roll or shift about and tend to become disengaged from the bundle or load. If this occurs on a truck or railroad car, ship or plane, serious injury to nearby persons may result, not to mention the damage to the vehicle or to the load itself.

It has been proposed to take up the slack in such bands due to settling or shifting of the load by driving wedges between the band and load, but such expedient is obviously a makeshift because if metal wedges are used they become loose as the load is jarred and jolted, and if wooden wedges are used they dry out and work loose. The only satisfactory way of tightening a band which has become loose around a load is to cut the band, splice a new piece to one cut end with the crimping tool, and then retighten, clamp, and crimp the loose ends.

Such procedure is normally not followed with loads shipped by truck or railroad because the trucker or railroad man either does not carry the three special tools or does not have the time or inclination to use them. On board ship or airplane, such tools may be carried for tightening the bands which strap down the deck load, but the usual time that such loads become loose is during a storm or rough weather, and under such conditions it is very difficult to carry out the aforesaid procedure, even though the required special tools are available.

It is an object of the present invention to provide a novel band tensioning device which can be applied to tension a band already bound around a load or to bind and secure the ends of such band initially.

Another object is to provide a novel tensioning device which can be used to tension a band already bound around a load, without requiring special tools.

A further object is to provide a novel tensioning device which can be used to tighten a band already bound around a load, and to retighten the band at successive intervals without shearing or reclamping or recrimping the band.

Another object is to provide a novel band tensioning device which is simple, lightweight and handy to apply, and is so inexpensive that it may be used as an expendable item, if desired.

A still further object is to provide a novel band tensioning device which may be used to bind and secure overlapping ends of a band around a load, and which will at the same time serve subsequently to tighten and retighten the band as the load settles or becomes loose.

Finally, it is an object of the present invention to provide a novel and improved band binding and tensioning device which overcomes the disadvantages of prior binding and tensioning devices, and which is easily used by unskilled persons without special tools to tension an already-fastened band.

These and other objects are accomplished by the parts, constructions, arrangements and combinations which comprise the present invention, the nature of which is set forth in the following general statement, and preferred embodiments of which are set forth in the following description and illustrated in the accompanying drawings, and which is particularly and distinctly pointed out and set forth in the appended claims forming part hereof.

In general terms, the tensioning device comprising the present invention includes a frame having laterally spaced side walls between which the metal strap or band is positioned and transverse end walls connecting said side walls and supporting said band, the side walls having aligned holes centered slightly below said end walls for receiving the split shank of a winding shaft carrying a ratchet toothed portion for engaging a rigid stop on one side wall, the hole adjacent said stop being vertically enlarged to permit the toothed portion to be moved upwardly into engagement with said stop by the tension of the band.

Referring to the drawings in which preferred embodiments of the invention are shown by way of example;

Figure 1 is an exploded perspective view of a preferred embodiment of the novel tensioning device;

Fig. 2 is a side elevation of the device in position on a metal band in readiness to tension the band;

Fig. 3 is a longitudinal sectional view thereof;

Fig. 4 is a similar sectional view with the shaft partly rotated to tension the band;

Fig. 5 is a transverse sectional view substantially on line 5—5 of Fig. 4;

Fig. 6 is a transverse sectional view similar to Fig. 3 but looking in the opposite direction;

Similar numerals refer to similar parts throughout the several views of the drawing.

Figure 7:
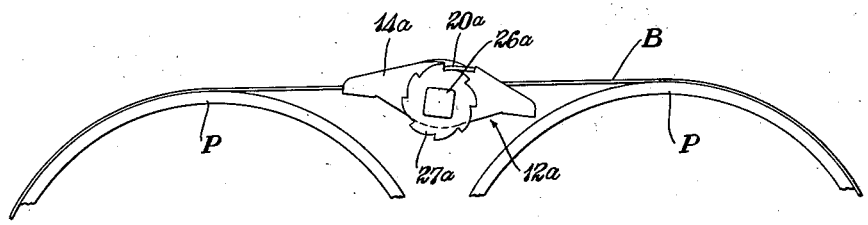
Fig. 7 is a side elevational view of a slightly different embodiment of the tensioning device applied to the two ends of a band bound around a bundle of pipes.

Referring first to the embodiment shown in Figs. 1 to 6, the tensioning device preferably includes a channel shaped frame 12 having laterally spaced normally vertical side walls 13 and 14 connected at their ends by transverse normally horizontal end walls 15 and 16. Between the end walls 15 and 16, the side walls are widened vertically to form the widened intermediate portions 13' and 14' respectively, with preferably inclined upper edges and rounded lower edges. The widened portions 13' and 14' are provided with aligned holes 17 and 18 for receiving a winding shaft.

As shown, the hole 18 in side wall 14 is elongated in a vertical direction or laterally of the side wall to make the opening elliptical, and the holes 17 and 18 are centered slightly below the upper surfaces of the end walls 15 and 16, for a purpose to be described. A rigid stop or locking projection 20 extends horizontally outwardly substantially at right angles to the wall 14 from its upper edge, and the inner edge 21 of the projection is directly above the vertically elongated hole 18, as best shown in Fig. 2.

The winding shaft for twisting the band B is indicated generally at 22, and has a split shank 23 which is insertable through the aligned holes 17 and 18, there being sufficient clearance between the shank 23 and hole 17 to make the shank easily insertable therethrough, as indicated in Fig. 5. The end of the shank is also rounded as indicated at 24 for facilitating the insertion of the shank, and a circumferential groove 25 is formed around the shank adjacent the end 24 for registering with the edge of hole 17 when the shank is fully inserted therein.

The other end of the winding shaft is provided with a wrench-receiving portion which is preferably in the form of a squared wrench lug 26, and between wrench lug 26 and the split shank 23 is a ratchet toothed gear 27 which has a plurality of teeth 28 forming notches for engaging the projection 20 to prevent rotation of the shaft in a clockwise direction, and the teeth are rounded to permit rotation of the shaft in a counterclockwise direction. As best shown in Figs. 2 and 6, the front edge 21 of the projection is preferably bent slightly downward to fit into the notch behind each tooth 28, and the notch 29 behind one of the teeth 28 is in position to receive the edge 21 when the slot 30 is in horizontal position to straddle the band B.

As shown in Figs. 3 and 4, the slot 30 straddles the band B when the band extends between the side walls 13 and 14 and is supported on end walls 15 and 16, with the shank 23 received in the aligned holes 17 and 18. When the shank 23 is inserted around the band and through the holes 17 and 18 the center of the band will be pulled slightly downward as shown in Fig. 3, because the center of the hole 17 is slightly below the upper surface of end walls 15 and 16 supporting the band and the engagement of gear 27 with projection 20 holds the band down.

As the shaft 22 is turned counterclockwise toward the position of Fig. 4, the rounded portion of tooth 28' engages projection 20 and forces the shank 23 downwardly in elongated hole 18 until the next notch registers with edge 21 when the tension on the band snaps the notch upwardly to engage the edge 21 and lock the shaft against rotation in a clockwise direction. The more the shaft is turned counterclockwise, the more tension is put on the band and the more tightly the projection 20 engages the ratchet gear 27.

During the initial turn of the shaft 22, as indicated in Fig. 4, the tension on the band tends to spread the shank 23, causing the groove 25 to engage the edge of hole 17, and preventing accidental withdrawal of the shaft.

In using the novel tensioning device to take up the slack in a metal band bound around a bundle, the channel frame 12 detached from the shaft 22 is first applied under the band at any location where there is sufficient space between the band and the articles bound thereby, and the frame is positioned around and under the band with the end walls 15 and 16 engaging the under surface of the band as shown in Fig. 3. The shank 23 of the winding shaft 22 is then inserted through the hole 18 with the slot 30 of the shank in horizontal position to straddle the band B, and the shank is pushed through the frame until the rounded end 24 is received in the opposite hole 17 when the notch 29 will receive the edge 21 of projection 20. The tensioning device is then in the position of Figs. 2, 3 and 6. By then applying a suitable wrench to the squared portion 26, and turning the shaft counterclockwise, the band will begin to wrap around the shank 23 in the position of Figs. 4 and 5 which will tighten or tension the band.

Thus, the bands around various types of loads being transported on various kinds of vehicles can be quickly and easily tightened by an unskilled person without special tools, at any time the band becomes slack due to the load settling or for any other reason. This procedure does not require shearing, splicing and retightening the band, and can be done in a few seconds under adverse conditions as in the case of a storm or the like. Once the tensioning device has been tightened, the device itself cannot become loose, because the band is bent sharply around and through the shank, as shown in Fig. 4, so that even though the band becomes slack, the device will remain in position for subsequent retightening of the band. The construction of the novel tensioning device is very simple and inexpensive, so that it may be used as an expendable item if desired.

Figure 8:
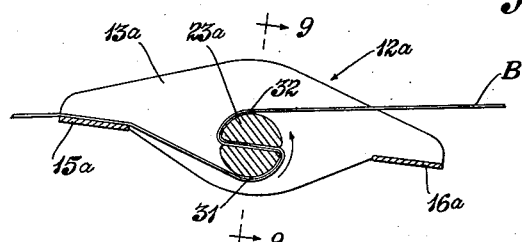
Fig. 8 is an enlarged longitudinal sectional view through the tensioning device of Fig. 7 showing how the two overlapped ends of the band are clamped and tensioned.

Referring to the embodiment of the invention shown in Figs. 7, 8, 9 and 11, this embodiment is identical in construction with the embodiment of Figs. 1 to 6 except that the slot 30a in the shank 23a is made wide enough to straddle two thicknesses of the band B, as indicated in Fig. 8, so that the device can be used to clamp together the ends of a band engirdling a bundle, as well as to tension the band.

As shown in Fig. 7, the device is shown applied to connect the ends of a band B which is drawn around a bundle of pipes or tubes indicated at P. As shown in Fig. 8, the overlapped ends of the band are wrapped around the shank 23a, the right-hand end of the band being indicated at 31 and the left-hand end at 32, the band being located between the side walls 13a and 14a connected by transverse end walls 15a and 16a of the frame 12a. The shank 23a has a squared wrench-receiving portion 26a on one end, and a ratchet gear 27a adjacent thereto for engaging the projection 20a.

Figure 9:
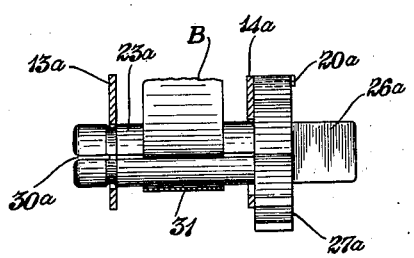
Fig. 9 is a transverse sectional view as on line 9—9, Fig. 8.

In order to facilitate the use of the novel tensioning device for connecting the ends of the band together as in Figs. 7, 8 and 9, a novel clamping and shearing device is preferably employed, as shown in Figs. 10, 11, 12 and 13. The shearing device includes a U-shaped bar 34 having down-turned and out-turned legs 35, and each leg 35 has a spring clamp thereon for frictionally holding an end of the band.

Each clamp includes an L-shaped back plate 36 having a bottom leg 37 for supporting the band, and a stud 38 projecting outwardly from the top of the back plate. A clamping jaw 39 is pivoted on each stud 38, and is retained thereon by a cotter pin 40 or the like. A coil spring 41 is mounted on each stud 38 between the jaw 39 and the back plate 36, and the ends of the spring are arranged to urge the bottom ends of the jaws to rotate outwardly away from each other about the pivots 38. The bottom ends of the jaws 39 are preferably beveled as indicated at 42 to frictionally engage the upper surface of a band supported on the adjacent leg 37 of the back plate.

Accordingly, a pull on the band tending to rotate the jaws 39 outwardly will cause the jaws tightly to grip and tighten the band.

Figure 10:
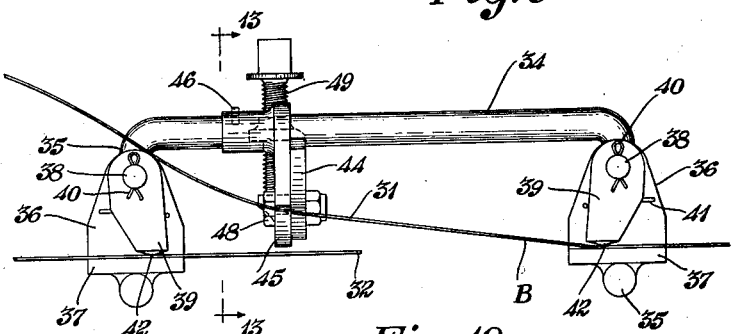
Fig. 10 is a front elevational view of a clamping and shearing device in position for holding the two ends of a band drawn around a bundle and in position to shear the one end from the other supply reel.
Figure 12:
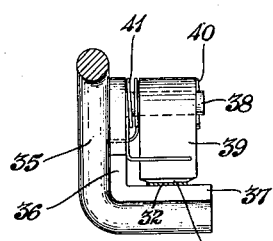
Fig. 12 is a transverse sectional view as on line 12—12, Fig. 11.

As viewed in Fig. 10, the end 32 of the band is gripped in the left-hand jaw, and the band is then led from the left-hand jaw around the bundle of articles to be bound, and the other end 31 is brought under the right-hand jaw and thence leads back to a band supply reel. The end 31 of the band is led through the blades 44 and 45 of a shear which is slidably mounted on the rod 34, there being a stud 46 on the rod which is adapted to enter a slot 47 in the shear when the shear is in the position of Fig. 10, for preventing rotation of the shear on the rod 34. The blades 44 and 45 of the shear are preferably pivoted together at 48, and a manipulating screw 49 is threaded through a flange 50 on the rear of blade 44 and engages a flange 51 on the rear of blade 45, for forcing the blades 44 and 45 together to shear the end 31 of the band when located between the blades, as in Figs. 10 and 13.

Figure 11:
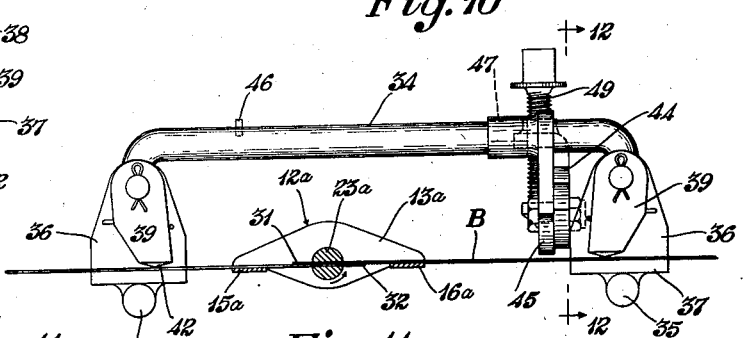
Fig. 11 is a similar view of the clamping and shearing device, showing the tensioning device of Fig. 7 applied to the overlapped ends of the band before turning the winding shaft.
Figure 13:
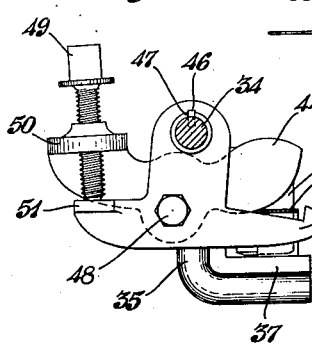
Fig. 13 is a transverse sectional view as on line 13—13, Fig. 10.

After the end 31 of the band has been thus sheared, the shear is moved to the right as indicated at Fig. 11 and the tensioning device 12a is applied to the overlapped ends 31 and 32 of the band. After the winding shaft 26a has been turned to tension the band, as in Fig. 8, the jaws 39 of the clamping and shearing device can be released with the fingers to remove the device from the band, and the turning of the winding shaft in a counterclockwise direction is continued to complete the tightening of the band.

If the band becomes slack around the load at any time during transportation thereof, the tensioning device of Figs. 7, 8, 9 and 11 can be easily manipulated by the use of a suitable wrench for further tensioning the band to take up the slack, so that once the device has been applied to fasten the ends of the band together, it can be subsequently used in the manner described in connection with Figs. 1 to 6 to take up the slack and tension the band around a load.

In the foregoing description, certain terms have been used for brevity, clearness and understanding, but no unnecessary limitations are to be implied therefrom beyond the requirements of the prior art, because such words are used for descriptive purposes herein and are intended to be broadly construed.

Moreover, the embodiments of the improved construction illustrated and described herein are by way of example, and the scope of the present invention is not limited to the exact details of construction.

Having now described the invention, the construction, the operation and use of preferred embodiments thereof, and the advantageous new and useful results obtained thereby; the new and useful constructions, and reasonable mechanical equivalents thereof obvious to those skilled in the art, are set forth in the appended claims.

I claim:

1. A tensioning device for taking up slack in a binding band including a frame having laterally spaced side walls and transverse end walls forming a channel support for the band, the side walls having aligned holes intermediate the end walls and centered slightly below the upper surfaces of said end walls, one of said holes being elongated at right angles to said end walls, a winding shaft having a split shank inserted through said holes and straddling a band positioned in said frame, a rigid stop on the frame above the elongated hole, and a ratchet toothed portion on the shaft for engaging said stop.

2. A tensioning device for taking up slack in a binding band including a frame having laterally spaced side walls and transverse end walls forming a channel support for the band, the side walls having aligned holes intermediate the end walls and centered slightly below the upper surfaces of said end walls, one of said holes being elongated at right angles to said end walls, a winding shaft having a split shank inserted through said holes and straddling a band positioned in said frame, a rigid stop on the frame above the elongated hole, a peripheral groove on the shank engaging the edge of the other hole, and a ratchet toothed portion on the shaft for engaging said stop.

3. A tensioning device for taking up slack in a binding band including a frame having laterally spaced side walls and transverse end walls forming a channel support for the band, the side walls having aligned holes, a winding shaft having a split shank insertable through said holes for straddling a band supported in said frame, a rigid projection on the frame above one of said holes, a ratchet toothed portion on said shaft for engaging said projection to lock said shaft against rotation in one direction, a wrench-receiving portion on the shaft, and the hole below said projection being elongated in line with said projection for permitting movement of the toothed portion toward and away from said projection.

4. A tensioning device for taking up slack in a binding band including a frame having laterally spaced side walls and transverse end walls forming a channel support for the band, the side walls having aligned holes, a winding shaft having a split shank insertable through said holes for straddling a band supported in said frame, a rigid projection on the frame above one of said holes, a ratchet toothed portion on said shaft for engaging said projection to lock said shaft against rotation in one direction, a wrench-receiving portion on the shaft, the hole below said projection being elongated in line with said projection for permitting movement of the toothed portion toward and away from said projection, and a peripheral groove on the shank engaging the edge of the other hole.

5. A metal band tensioning device including a channel frame having side walls and transverse end walls, the side walls being widened laterally between the end walls, the widened side wall portions having aligned holes and one hole being enlarged laterally of said end walls, a projection on the frame laterally adjacent to said enlarged hole, a shaft having a split shank insertable through said aligned holes for straddling a band supported on the end walls within the channel frame, and a ratchet toothed gear on the shaft for engaging said projection.

6. A metal band tensioning device including a channel frame having side walls and transverse end walls, the side walls being widened laterally between the end walls, the widened side wall portions having aligned holes and one hole being enlarged laterally of said end walls, a projection on the frame laterally adjacent to said enlarged hole, a shaft having a split shank insertable through said aligned holes for straddling a band supported on the end wall within the channel frame, a ratchet toothed gear on the shaft for engaging said projection, a circumferential groove on the end of the shank for engaging the edge of the other hole, and a wrench-receiving portion on the other end of the shaft.

7. A tensioning device for tightening a metal band bound around a bundle of articles including a channel frame having spaced side walls and transverse end walls connecting the side walls for supporting a band located between the side walls, the intermediate portions of the side walls having aligned holes, a projection on the frame adjacent one hole, the hole being elongated in line with said projection, a shaft having a split shank axially insertable through said aligned holes for straddling the band, and a ratchet gear on said shaft engageable with said projection to lock the shaft against rotation in one direction.

8. A tensioning device for tightening a metal band bound around a bundle of articles including a channel frame having spaced side walls and transverse end walls connecting the side walls for supporting a band located between the side walls, the intermediate portions of the side walls having substantially aligned holes, one hole being larger than the other, a projection on the frame adjacent said larger hole, a shaft having a split shank axially insertable through said aligned holes for straddling the band, and a ratchet gear on said shaft engageable with said projection to lock the shaft against rotation in one direction.

9. A tensioning device for tightening a metal band around a bundle of articles, including a channel frame having spaced vertical side walls and transverse horizontal end walls connecting the side walls for supporting the overlapping ends of a band, the intermediate portions of the side walls having substantially aligned holes, one hole being larger than the other, a rigid exterior projection on one side wall above said larger hole, a winding shaft having a split shank axially insertable through said aligned holes for straddling the overlapping ends of the band, and a ratchet gear on said shaft engageable with said projection to lock the shaft against rotation in one direction.

10. A tensioning device for tightening a metal band around a bundle of articles, including a channel frame having spaced vertical side walls and transverse horizontal end walls connecting the side walls for supporting the overlapping ends of a band, the intermediate portions of the side walls having aligned holes centered below the end walls, one of said holes being vertically elongated, a rigid exterior projection on one side wall above said elongated hole, a winding shaft having a split shank axially insertable through said aligned holes for straddling the overlapping ends of the band, and a ratchet gear on said shaft engageable with said projection to lock the shaft against rotation in one direction.

RAYMOND J. GARTNER.

REFERENCES CITED

The following references are of record in the file of this patent:

UNITED STATES PATENTS

| Number | Name | Date |
|---|---|---|
| 35,038 | Pierce | Apr. 22, 1862 |
| 562,558 | Terry | June 23, 1896 |